(12) United States Patent
Liu et al.

(10) Patent No.: US 12,731,792 B2
(45) Date of Patent: *Sep. 8, 2026

(54) POSITIVE ELECTRODE CURRENT COLLECTOR, POSITIVE ELECTRODE PLATE, ELECTROCHEMICAL DEVICE, AND APPARATUS

(71) Applicant: CONTEMPORARY AMPEREX TECHNOLOGY (HONG KONG) LIMITED, Hong Kong (CN)

(72) Inventors: Xin Liu, Ningde City (CN); Shiwen Wang, Ningde City (CN); Qisen Huang, Ningde City (CN); Cheng Li, Ningde City (CN); Mingling Li, Ningde City (CN); Jia Peng, Ningde City (CN); Xianghui Liu, Ningde City (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 198 days.

This patent is subject to a terminal disclaimer.

(21) Appl. No.: 17/536,103

(22) Filed: Nov. 29, 2021

(65) Prior Publication Data

US 2022/0085379 A1 Mar. 17, 2022

Related U.S. Application Data

(63) Continuation of application No. PCT/CN2019/125149, filed on Dec. 13, 2019.

(30) Foreign Application Priority Data

May 31, 2019 (CN) ......................... 201910471353.2

(51) Int. Cl.
*H01M 10/0525* (2010.01)
*H01M 4/02* (2006.01)
(Continued)

(52) U.S. Cl.
CPC ........... *H01M 4/662* (2013.01); *H01M 4/366* (2013.01); *H01M 10/0525* (2013.01); *H01M 2004/028* (2013.01)

(58) Field of Classification Search
CPC ............. H01M 4/36; H01M 4/64–667; H01M 10/052–0525; H01M 4/02
See application file for complete search history.

(56) References Cited

U.S. PATENT DOCUMENTS

| | | | | |
|---|---|---|---|---|
| 6,235,427 B1 * | 5/2001 | Idota | ........................ | H01M 4/58 429/223 |
| 10,658,673 B2 * | 5/2020 | Liang | ................ | H01M 10/0525 |

(Continued)

FOREIGN PATENT DOCUMENTS

| | | |
|---|---|---|
| CN | 1591932 A | 3/2005 |
| CN | 101207186 A | 6/2008 |

(Continued)

OTHER PUBLICATIONS

Machine translation of Qiu, CN 106981665. Originally available Jul. 25, 2017. (Year: 2017).*

(Continued)

*Primary Examiner* — Nicole M. Buie-Hatcher
*Assistant Examiner* — Jacob Buchanan
(74) *Attorney, Agent, or Firm* — East IP P.C.

(57) ABSTRACT

The present application discloses a positive electrode current collector, a positive electrode plate, an electrochemical device, and an apparatus. The positive electrode current collector includes a polymer material-based support layer and an aluminum-based conductive layer disposed on at (Continued)

least one surface of the support layer; a thickness $D_1$ of the aluminum-based conductive layer, a tensile strength T of the support layer, and a thickness $D_2$ of the support layer satisfy a relational formula $0.01 \le (200 \times D_1)/(T \times D_2) \le 0.5$, in the formula $D_1$ and $D_2$ are in the same unit, and T is in MPa. The positive electrode current collector has relatively high mechanics and mechanical properties, good electrical conductivity and current collection performance and low weight, which can improve preparation yield of the positive electrode current collector, the positive electrode plate and the electrochemical device and their reliability during use.

11 Claims, 4 Drawing Sheets

(51) Int. Cl.
*H01M 4/36* (2006.01)
*H01M 4/66* (2006.01)

(56) References Cited

U.S. PATENT DOCUMENTS 10,714,757 B2 * 7/2020 Liang .................... H01M 4/668
10,749,184 B2 * 8/2020 Liang .................... H01M 4/668
10,763,513 B2 * 9/2020 Liang ................ H01M 10/4235
10,910,652 B2 * 2/2021 Liang .................... H01M 4/664
11,177,479 B2 * 11/2021 Liang .................... H01M 4/668
11,611,081 B2 * 3/2023 Liu ....................... H01M 4/667
11,646,424 B2 * 5/2023 Liu ....................... H01M 4/136
429/332
11,769,883 B2 9/2023 Liang et al.
12,051,811 B2 * 7/2024 Li ..................... H01M 10/0525
12,148,932 B2 * 11/2024 Li ....................... H01M 50/249
2004/0126663 A1 * 7/2004 Sudano ............... H01M 10/052
429/234
2005/0221190 A1 10/2005 Sudano et al.
2006/0127773 A1 6/2006 Kawakami et al.
2008/0118830 A1 * 5/2008 Lee ..................... H01M 50/121
429/163
2010/0075223 A1 3/2010 Hwang et al.
2010/0291442 A1 11/2010 Wang et al.
2011/0111294 A1 * 5/2011 Lopez .................. H01M 4/525
977/773
2011/0287322 A1 11/2011 Moon et al.
2012/0208082 A1 8/2012 Honda et al.
2013/0115510 A1 5/2013 Tani et al.
2015/0303450 A1 * 10/2015 Miki ..................... H01M 4/583
429/217
2016/0276653 A1 9/2016 Seki et al.
2017/0009360 A1 1/2017 Schuh et al.
2017/0324077 A1 11/2017 Liu et al.
2017/0338493 A1 11/2017 Shin et al.
2018/0006307 A1 1/2018 Song et al.
2018/0198132 A1 7/2018 Liang et al.
2018/0301709 A1 * 10/2018 Qiu ......................... C23C 14/30
2019/0173090 A1 * 6/2019 Liang ...................... H01M 4/75
2019/0173092 A1 6/2019 Liang et al.
2019/0245210 A1 8/2019 Matsushita
2019/0305299 A1 10/2019 Zhang et al.
2019/0363344 A1 11/2019 Shen et al.
2020/0295377 A1 9/2020 Liang et al.
2020/0388875 A1 12/2020 Kano et al.
2021/0075003 A1 3/2021 Yasuda et al.
2021/0119196 A1 * 4/2021 Li ........................ H01M 4/668
2021/0119218 A1 4/2021 Li et al.
2021/0119221 A1 4/2021 Li et al.
2021/0151769 A1 5/2021 Li et al.
2021/0151772 A1 5/2021 Li et al.
2021/0167397 A1 6/2021 Kim et al.
2021/0210763 A1 7/2021 Li et al.
2021/0288329 A1 9/2021 Liang et al.
2021/0296654 A1 9/2021 Liang et al.
2022/0037667 A1 2/2022 Li et al.
2022/0037669 A1 2/2022 Li et al.
2022/0037670 A1 2/2022 Li et al.
2022/0037672 A1 2/2022 Xue et al.
2022/0085384 A1 * 3/2022 Liu ....................... H01M 4/662
2022/0093932 A1 3/2022 Li et al.
2022/0209226 A1 6/2022 Li et al.
2024/0113288 A1 * 4/2024 Li ........................ H01M 4/667

FOREIGN PATENT DOCUMENTS

CN 101627494 A 1/2010
CN 103268942 A 8/2013
CN 103384012 A 11/2013
CN 103429628 A 12/2013
CN 103907226 A 7/2014
CN 204088469 U 1/2015
CN 105845978 A 8/2016
CN 106654285 A 5/2017
CN 106711462 A 5/2017
CN 106910897 A 6/2017
CN 106935901 A 7/2017
CN 106981665 A * 7/2017 ........... H01M 4/667
CN 107123812 A 9/2017
CN 107154499 A 9/2017
CN 107221676 A 9/2017
CN 206849947 U 1/2018
CN 107768677 A 3/2018
CN 104428928 B 4/2018
CN 108155387 A 6/2018
CN 108281662 A 7/2018
CN 108306013 A 7/2018
CN 108832134 A 11/2018
CN 108844878 A 11/2018
CN 109216703 A 1/2019
CN 109461880 A 3/2019
CN 109830688 A 5/2019
CN 109873164 A 6/2019
CN 109873166 A 6/2019
CN 110890531 A 3/2020
CN 110943222 A 3/2020
CN 110943227 A 3/2020
EP 2924772 A1 9/2015
EP 3346522 A1 7/2018
EP 3496190 A1 6/2019
EP 3624240 A1 3/2020
EP 3951956 A1 2/2022
JP H09120818 A 5/1997
JP H11149008 A 6/1999
JP 2001297633 A 10/2001
JP 2002059362 A 2/2002
JP 2004103475 A 4/2004
JP 2004273132 A 9/2004
JP 2005100959 A 4/2005
JP 2006012998 A 1/2006
JP 2006512722 A 4/2006
JP 2007217598 A 8/2007
JP 2008140552 A 6/2008
JP 2011068727 A 4/2011
JP 2011079284 A 4/2011
JP 2015185407 A 10/2015
JP 2016121308 A 7/2016
JP 2018181823 A 11/2018
JP 2018190656 A 11/2018
JP 2019102429 A 6/2019
JP 2020047577 A 3/2020
KR 100669338 B1 1/2007
KR 20120019568 A 3/2012
WO 2009157263 A1 12/2009
WO 2012127561 A1 9/2012
WO 2018179111 A1 10/2018
WO 2018207643 A1 11/2018

OTHER PUBLICATIONS

The First Office Action for Chinese Application No. 202110560987.2, dated Oct. 25, 2023, 10 pages.
The First Office Action for Chinese Application No. 201910472007.

(56) References Cited

OTHER PUBLICATIONS 6, dated Aug. 20, 2020, 16 pages.
The Second Office Action for Chinese Application No. 201910472007.6, dated Nov. 10, 2020, 16 pages.
The Notification to Grant Patent Right for Invention for Chinese Application No. 201910472007.6, dated Feb. 2, 2021, 6 pages.
The First Office Action for Chinese Application No. 201910471353.2, dated Oct. 10, 2020, 14 pages.
The Notification to Grant Patent Right for Invention for Chinese Application No. 201910471353.2, dated Mar. 29, 2021, 6 pages.
The First Office Action for Chinese Application No. 201910469957.3, dated Oct. 26, 2020, 9 pages.
The First Office Action for Indian Application No. 202117056343, dated Mar. 30, 2022, 7 pages.
The International search report for PCT Application No. PCT/CN2019/090412, dated Mar. 4, 2020, 6 pages.
The International search report for PCT Application No. PCT/CN2019/125149, dated Mar. 12, 2020, 20 pages.
The International search report for PCT Application No. PCT/CN2019/125148, dated Mar. 16, 2020, 8 pages.
The First Office Action for Japanese Application No. 2021-556478, dated Oct. 3, 2022, 7 pages.
The First Office Action for Japanese Application No. 2021-556889, dated Nov. 8, 2022, 9 pages.
The First Office Action for Japanese Application No. 2021-564148, dated Nov. 15, 2022, 7 pages.
The extended European search report for EP Application No. 19930524.4, dated May 10, 2022, 8 pages.
The First Office Action for European Application No. 19930524.4, dated Jan. 3, 2023, 4 pages.
The extended European search report for EP Application No. 19930724.0, dated May 10, 2022, 7 pages.
The First Office Action for European Application No. 19930724.0, dated Jan. 4, 2023, 7 pages.
The extended European search report for EP Application No. 19931131.7, dated Jul. 26, 2022, 8 pages.
The Non-final Office Action for U.S. Appl. No. 17/535,690, dated Jun. 27, 2024, 22 pages.
The Non-final Office Action for U.S. Appl. No. 17/537,520, dated Sep. 28, 2024, 37 pages.
The Final Office Action for U.S. Appl. No. 17/535,690, dated Nov. 29, 2024, 41 pages.
The Final Office Action for U.S. Appl. No. 17/537,520, dated Apr. 2, 2025, 18 pages.
The First Office Action dated Feb. 23, 2023 for Chinese Application No. 202080005544.0 , 14 pages.
The First Office Action dated Aug. 23, 2025 for Chinese Application No. 202311325779.X , 16 pages.
The EESR dated Jul. 25, 2022 for EP Application No. 20930756.0 , 7 pages.
The Non Final Rejection dated Dec. 23, 2025 for U.S. Appl. No. 17/537,520 , 16 pages.
The Non Final Rejection dated Dec. 6, 2023 for U.S. Appl. No. 17/697,930 , 24 pages.
The Final Rejection dated Nov. 6, 2024 for U.S. Appl. No. 17/697,930 , 16 pages.
The ISR dated Jan. 14, 2020 for the PCT/CN2019/119739, 14 pages.
The Final Rejection dated Jul. 11, 2024 for U.S. Appl. No. 17/112,766 , 24 pages.
The Non Final Rejection dated Jan. 31, 2024 for U.S. Appl. No. 17/112,766 , 31 pages.
The Non Final Rejection dated Oct. 17, 2024 for U.S. Appl. No. 17/112,766 , 23 pages.
The EESR dated Aug. 5, 2021 for EP Application No. 19902406.8 , 7 pages.
The First Office Action dated Jun. 3, 2020 for Chinese Application No. 201811642323.5, 15 pages.
The Final Rejection dated Mar. 10, 2025 for U.S. Appl. No. 17/112,766 , 27 pages.

* cited by examiner

POSITIVE ELECTRODE CURRENT COLLECTOR, POSITIVE ELECTRODE PLATE, ELECTROCHEMICAL DEVICE, AND APPARATUS

CROSS-REFERENCE TO RELATED APPLICATION

This application is a continuation of International Application No. PCT/CN2019/125149, filed on Dec. 13, 2019, which claims priority to Chinese Patent Application No. 201910471353.2 entitled "Positive Electrode Current Collector, Positive Electrode Plate and Electrochemical Device" and filed on May 31, 2019, both of which are incorporated herein by reference in their entireties.

TECHNICAL FIELD

This application belongs to the technical field of electrochemical devices, and specifically relates to a positive electrode current collector, a positive electrode plate, an electrochemical device, and an apparatus.

BACKGROUND

Electrochemical devices represented by lithium-ion secondary batteries have relatively high charge and discharge performance and environmental friendliness, and therefore, have been widely used in electric vehicles and consumer electronic products. Current collectors are important parts of the electrochemical devices. They not only provide support for active material layers, but also collect current generated by the active material layers for external output. Therefore, the current collectors have an important influence on the performance of electrode plates and electrochemical devices.

Therefore, positive electrode current collectors with excellent performance are still required.

SUMMARY

In the first aspect, the present application provides a positive electrode current collector, including a polymer material-based support layer and an aluminum-based conductive layer disposed on at least one surface of the support layer; wherein a thickness $D_1$ of the aluminum-based conductive layer, a tensile strength T of the support layer, and a thickness $D_2$ of the support layer satisfy a relational formula 1 below, $$0.01 \leq (200 \times D_1)/(T \times D_2) \leq 0.5 \quad \text{formula 1}$$

in the formula 1, $D_1$ and $D_2$ are in the same unit, and T is in MPa.

In the second aspect, the present application provides a positive electrode plate, including a positive electrode current collector and a positive electrode active material layer disposed on the positive electrode current collector, wherein the positive electrode current collector is the positive electrode current collector according to the first aspect of the present application.

In the third aspect, the present application provides an electrochemical device, including a positive electrode plate, a negative electrode plate and an electrolyte, wherein the positive electrode plate is the positive electrode plate according to the second aspect of the present application.

In the fourth aspect, the present application provides an apparatus, including the electrochemical device according to the third aspect of the present application.

The positive electrode current collector provided by the present application includes a polymer material-based support layer and an aluminum-based conductive layer disposed on the support layer, and the thickness $D_1$ of the aluminum-based conductive layer, the tensile strength T of the support layer, and the thickness $D_2$ of the support layer satisfy the relational formula 1. It is surprisingly found that the positive electrode current collector has appropriate toughness and good electrical conductivity and current collecting performance at the same time. The appropriate toughness ensures that the positive electrode current collector has relatively high mechanics and mechanical properties, so that the positive electrode current collector can withstand certain deformation without breakage during the production and working process of the electrochemical device. This improves the machining property of the positive electrode current collector and its stability during use, which can effectively prevent it from breaking or cracking during subsequent machining and use, thereby significantly improving yields of the positive electrode current collector and the positive electrode plate and electrochemical device using the same during preparation and their reliability during use. By using the positive electrode current collector with good electrical conductivity and current collecting performance, the electrochemical device has relatively high electrochemical performance. In addition, the positive electrode current collector provided by the present application can also increase gravimetric energy density of the electrochemical device.

The apparatus of the present application includes the electrochemical device provided by the present application, and thus has at least the same advantages as the electrochemical device.

DESCRIPTION OF THE DRAWINGS

In order to explain the technical solutions of the embodiments of the present application more clearly, the following will briefly introduce the drawings that need to be used in the embodiments of the present application. A person of ordinary skill in the art can obtain other drawings based on the drawings without creative work.

DETAILED DESCRIPTION

In order to make the objectives, technical solutions and beneficial technical effects of the present application clearer, the present application will be further described in detail below in conjunction with embodiments. It should be understood that the embodiments described in this specification are only for explaining the application, not intending to limit the application.

For the sake of brevity, only certain numerical ranges are explicitly disclosed herein. However, any lower limit may be combined with any upper limit to form a range that is not explicitly described; and any lower limit may be combined with other lower limits to form an unspecified range, and any upper limit may be combined with any other upper limit to form an unspecified range. Further, although not explicitly specified, each point or single value between the endpoints of the range is included in the range. Thus, each point or single value can be combined with any other point or single value as its own lower limit or upper limit or combined with other lower limit or upper limit to form a range that is not explicitly specified.

In the description herein, it should be noted that, unless otherwise specified, a numeric range described with the term "above" or "below" includes the lower or upper limit itself, and "more" in "one or more" means two or more.

The above summary of the present application is not intended to describe each disclosed embodiment or every implementation in this application. The following description illustrates exemplary embodiments more specifically. In many places throughout the application, guidance is provided through a series of examples, which can be used in various combinations. In each instance, the enumeration is only a representative group and should not be interpreted as exhaustive.

Positive Electrode Current Collector

Figure 1:
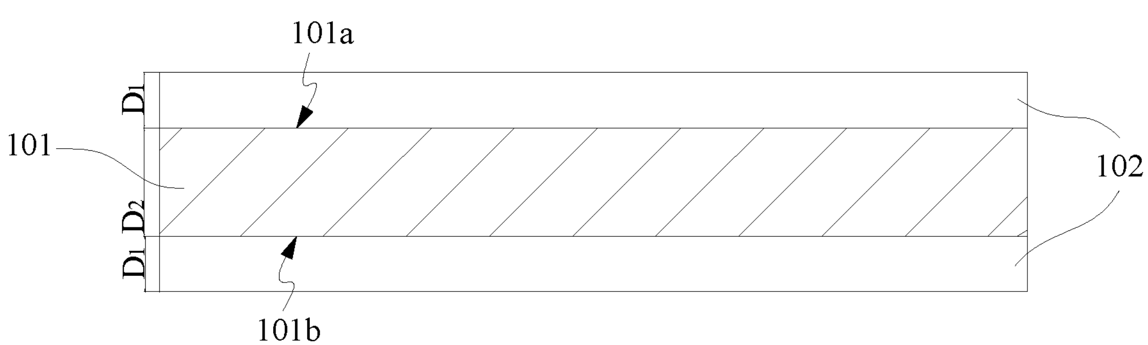
FIG. 1 is a schematic structural diagram of a positive electrode current collector according to an embodiment of the present application.

The first aspect of the present application provides a positive electrode current collector 10. FIG. 1 is a schematic structural diagram of a positive electrode current collector 10 as an example. Referring to FIG. 1, the positive electrode current collector 10 includes a polymer material-based support layer 101 and an aluminum-based conductive layer 102 that are laminated. The support layer 101 has a first surface 101*a* and a second surface 101*b* opposite in its thickness direction, and the aluminum-based conductive layer 102 is disposed on the first surface 101*a* and the second surface 101*b* of the support layer 101.

It is understandable that the aluminum-based conductive layer 102 may also be disposed on either of the first surface 101*a* and the second surface 101*b* of the support layer 101. For example, the aluminum-based conductive layer 102 is disposed on the first surface 101*a* of the support layer 101. Apparently, the aluminum-based conductive layer 102 may also be disposed on the second surface 101*b* of the support layer 101.

For convenience, a brittleness parameter C of the positive electrode current collector 10 is defined as:

$$C=(200\times D_1)/(T\times D_2) \quad \text{formula 1}$$

wherein, 200 is a coefficient, $D_1$ is a thickness of the aluminum-based conductive layer 102, T is a tensile strength of the support layer 101, $D_2$ is a thickness of the support layer 101, $D_1$ and $D_2$ are in the same unit, and T is in MPa.

The brittleness parameter C of the positive electrode current collector 10 satisfies: $0.01 \le C \le 0.5$.

The formula 1 is applicable to the positive electrode current collector 10 where the aluminum-based conductive layer 102 is disposed on at least one surface of the support layer 101, more applicable to the positive electrode current collector 10 where the aluminum-based conductive layer 102 is respectively disposed on two opposite surfaces of the support layer 101, and especially applicable to the positive electrode current collector 10 where the aluminum-based conductive layer 102 is respectively disposed on two opposite surfaces of the support layer 101 and the aluminum-based conductive layers 102 on both sides have equal or substantially equal thickness. The aforementioned substantially equal means that the aluminum-based conductive layers 102 on both sides have a thickness difference of not more than 10%, for example, not more than 10%, 9%, 8%, 7%, 6%, 5%, 3%, 2%, or 1%.

In some embodiments, the "thickness $D_1$ of the aluminum-based conductive layer 102" refers to the thickness of the aluminum-based conductive layer 102 on a single side of the support layer 101.

In some other embodiments, the "thickness $D_1$ of the aluminum-based conductive layer 102" refers to an average thickness of the aluminum-based conductive layers 102 on both sides of the support layer 101, that is, half of a sum of thicknesses of the aluminum-based conductive layers 102 on both sides of the support layer 101.

For example, for the positive electrode current collector 10 where the aluminum-based conductive layer 102 is disposed on a single side of the support layer 101, the "thickness $D_1$ of the aluminum-based conductive layer 102" refers to the thickness of the aluminum-based conductive layer 102 on the single side of the support layer 101. For the positive electrode current collector 10 where the aluminum-based conductive layer 102 is respectively disposed on two opposite surfaces of the support layer 101 and the aluminum-based conductive layers 102 on both sides have equal or substantially equal thickness, the "thickness $D_1$ of the aluminum-based conductive layer 102" refers to the thickness of the aluminum-based conductive layer 102 on the single side of the support layer 101 or the average thickness of the aluminum-based conductive layers 102 on both sides of the support layer 101. For the positive electrode current collector 10 where the aluminum-based conductive layer 102 is respectively disposed on two opposite surfaces of the support layer 101 and the aluminum-based conductive layers 102 on both sides have a thickness difference of more than 10%, the "thickness $D_1$ of the aluminum-based conductive layer 102" refers to the average thickness of the aluminum-based conductive layers 102 on both sides of the support layer 101. This can better apply the formula 1.

The tensile strength T of the support layer 101 can be measured by instruments and methods well-known in the art, for example, measured by means of American INSTRON 3365 universal tensile tester. An exemplary measurement method is as follows: cutting the support layer 101 into a strip sample, such as a sample with a width of 15 mm and a length of 150 mm, which is then loaded the sample into two opposite clamps of the universal tensile tester with an initial length set to 50 mm; performing a tensile test at a tensile rate of 5 mm/min until the sample breaks; and recording maximum tensile force F borne when the sample breaks to calculate the tensile strength T of the support layer 101 according to T=F/S, where S is initial cross-sectional area of the sample. S can be calculated by the product of the width and thickness of the sample. The thickness of the sample is the thickness $D_2$ of the support layer 101.

The thickness $D_1$ of the aluminum-based conductive layer 102 and the thickness $D_2$ of the support layer 101 can be measured by instruments and methods known in the art, for example, by a ten-thousandth micrometer.

The positive electrode current collector 10 of the present application includes a polymer material-based support layer 101 and an aluminum-based conductive layer 102 disposed on the support layer 101, and the brittleness parameter C of the positive electrode current collector 10 satisfies $0.01 \leq C \leq 0.5$. Therefore, the positive electrode current collector 10 has appropriate toughness, which ensures that the positive electrode current collector has relatively high mechanics and mechanical properties. The positive electrode current collector 10 can withstand certain deformation without breakage during the production and working process of an electrochemical device, which is beneficial to improving the machining property of the positive electrode current collector 10 and its stability during use, and effectively prevents it from breaking or cracking during its preparation and use. Therefore, the present application can significantly improve yields of the positive electrode current collector 10 and the positive electrode plate and electrochemical device using the same during preparation and their reliability during use.

The positive electrode current collector 10 is not prone to breaking and cracking during the production and working process of the electrochemical device, which ensures electrical conductivity and current collecting performance of the positive electrode current collector 10, prevents the positive electrode active material layer from breaking or cracking, and maintains the continuity of its internal conductive network to ensure effective performance of the positive electrode active material layer. Using the positive electrode current collector 10 of the present application is beneficial to prolonging the service life of the electrochemical device.

The brittleness parameter C of the positive electrode current collector 10 is within the above range, which also ensures that the positive electrode current collector 10 has good electrical conductivity and current collecting performance. This is beneficial to enabling the positive electrode plate and the electrochemical device to have low impedance, and reducing polarization of the electrochemical device, so that the electrochemical device has relatively high electrochemical performance, and the electrochemical device has relatively high rate performance and cycle performance.

In addition, because the density of the polymer material-based support layer 101 is smaller than that of a metal, the positive electrode current collector 10 of the present application can also reduce weight of the electrochemical device, thereby further improving the energy density of the electrochemical device.

In some optional embodiments, the brittleness parameter C of the positive electrode current collector 10 may be ≤0.5, ≤0.48, ≤0.45, ≤0.42, ≤0.4, ≤0.38, ≤0.36, ≤0.35, ≤0.32, ≤0.3, ≤0.28 or ≤0.25, and further may be ≥0.01, >0.05, ≥0.08, ≥0.1, ≥0.12, ≥0.15, ≥0.17, ≥0.19, ≥0.2 or ≥0.22.

The inventors of the present application found that, by making the brittleness parameter C of the positive electrode current collector 10 within an appropriate range, the energy density of the electrochemical device can be better improved, while the positive electrode current collector 10 and the positive electrode plate have relatively high current carrying capacity. The electrochemical device using the positive electrode current collector 10 has relatively good comprehensive performance. Preferably, the brittleness parameter C of the positive electrode current collector 10 is from 0.05 to 0.3. The positive electrode current collector 10 can better exert the above-mentioned effects.

In some embodiments, the thickness $D_1$ of the aluminum-based conductive layer 102 is preferably 30 nm$\leq D_1 \leq$3 μm. For example, the thickness $D_1$ of the aluminum-based conductive layer 102 may be ≤3 μm, ≤2.5 μm, ≤2 μm, ≤1.8 μm, ≤1.5 μm, ≤1.2 μm, ≤1 μm, ≤900 nm, ≤750 nm, ≤450 nm, ≤250 nm or ≤100 nm, and further may be ≥30 nm, ≥80 nm, ≥100 nm, ≥150 nm, ≥300 nm, ≥400 nm, ≥600 nm, ≥800 nm, ≥1 μm or ≥1.6 μm.

The relatively thin aluminum-based conductive layer 102 is disposed on the surface of the support layer 101, which can significantly reduce the weight of the positive electrode current collector 10 as compared to existing metal current collectors (such as an aluminum foil), thereby reducing the weight of the electrochemical device and significantly increasing the energy density of the electrochemical device.

In addition, the thickness $D_1$ of the aluminum-based conductive layer 102 can lead to the aluminum-based conductive layer 102 having relatively high electrical conductivity, which is beneficial to enabling the positive electrode current collector 10 to have relatively high electrical conductivity and current collecting performance, thereby improving the performance of the electrochemical device. Moreover, the aluminum-based conductive layer 102 is not prone to breaking during processing and use, so that the positive electrode current collector 10 has relatively high breaking toughness and relatively good mechanical stability and working stability. Especially, the thickness $D_1$ of the aluminum-based conductive layer 102 in an appropriate range can result in smaller burr generated in the case of abnormal situations such as nail penetration in the electrochemical device, thereby reducing the risk of the generated metal burr contacting with the electrode and thus improving safety performance of the electrochemical device.

Preferably, 300 nm$\leq D_1 \leq$2 μm. More preferably, 500 nm$\leq D_1 \leq$1.5 μm. Especially preferably, 800 nm$\leq D_1 \leq$1.2 μm.

In some embodiments, the aluminum-based conductive layer 102 may include one or more of aluminum and aluminum alloy. Weight percentage content of aluminum element in the aluminum alloy is preferably 80 wt % or more, and more preferably 90 wt % or more.

In some embodiments, the tensile strength T of the support layer 101 is preferably 100 MPa≤T≤400 MPa, and more preferably 150 MPa≤T≤300 MPa. The tensile strength of the support layer 101 within a proper range is beneficial to enabling the positive electrode current collector 10 to have relatively high mechanics properties, so that the positive electrode current collector 10 is not prone to breaking or cracking. In addition, the support layer 101 will not be excessively extended or deformed, thereby further preventing the aluminum-based conductive layer 102 from breaking or cracking, enabling relatively high bonding strength between the support layer 101 and the aluminum-based conductive layer 102, and reducing the peeling of the aluminum-based conductive layer 102. Therefore, using the positive electrode current collector 10 is beneficial to improving the service life and cycle performance of the electrochemical device.

The proper tensile strength T is also suitable for better supporting the aluminum-based conductive layer 102 by the support layer 101.

In some embodiments, the support layer 101 has a Young's modulus E≥2 Gpa. The support layer 101 has rigidity, so that it can better support the aluminum-based conductive layer 102 to ensure the overall strength of the positive electrode current collector 10. In addition, the support layer 101 will not be excessively extended or deformed during the processing of the positive electrode current collector 10, which further prevents the support layer 101 and the aluminum-based conductive layer 102 from breaking, and enabling higher bonding strength between the support layer 101 and the aluminum-based conductive layer 102 without peeling. Therefore, the mechanical stability and working stability of the positive electrode current collector 10 are improved, thereby improving the performance of the electrochemical device, such as improving cycle life.

Preferably, the Young's modulus E of the support layer 101 satisfies 2 GPa≤E≤20 GPa. For example, E is 2 GPa, 3 GPa, 4 GPa, 5 GPa, 6 GPa, 7 GPa, 8 GPa, 9 GPa, 10 GPa, 11 GPa, 12 GPa, 13 GPa, 14 GPa, 15 GPa, 16 GPa, 17 GPa, 18 GPa, 19 GPa, or 20 GPa. This enables the support layer 101 to have appropriate rigidity and appropriate toughness, and ensures winding flexibility of the support layer 101 and the positive electrode current collector 10 using the support layer 101 during processing.

The Young's modulus E of the support layer 101 can be measured by instruments and methods known in the art. For example, the Young's modulus E is measured by means of American INSTRON 3365 universal tensile tester. As an example, the support layer 101 is cut into a 15 mm×200 mm sample, thickness h (μm) of the sample is measured with a ten-thousandth micrometer, a tensile test is performed with the tensile tester at normal temperature and pressure (25° C., 0.1 MPa), an initial position is set such that the sample between the clamps is 50 mm long, the sample is stretched at a speed of 5 mm/min, load L (N) from stretching to break and device displacement γ (mm) are recorded, then stress ε (GPa)=L/(15×h), strain η=γ/50, a stress-strain curve is drawn, and the curve of an initial linear region is selected, wherein the slope of this curve is the Young's modulus E.

In some embodiments, the thickness $D_2$ of the support layer 101 satisfies 1 μm≤$D_2$≤30 μm. The thickness $D_2$ of the support layer 101 enables it to have relatively high mechanical strength, not easy to break during processing and use, and to well support and protect the aluminum-based conductive layer 102, thereby improving the mechanical stability and working stability of the positive electrode current collector 10. Meanwhile, the support layer 101 enables the electrochemical device to have relatively small size and relatively low weight, thereby increasing volumetric energy density and gravimetric energy density of the electrochemical device.

In some optional embodiments, the thickness $D_2$ of the support layer 101 may be ≤30 μm, ≤25 μm, ≤20 μm, ≤18 μm, ≤15 μm, ≤12 μm, ≤10 μm or ≤8 μm, and further may be ≥1, ≥1.5 μm, ≥2 μm, ≥3 μm, ≥4 μm, ≥5 μm, ≥6 μm, ≥7 μm, ≥9 μm or ≥16 μm. Preferably, 1 nm≤$D_2$≤20 μm. More preferably, 1 μm≤$D_2$≤15 μm. Especially preferably, 2 μm≤$D_2$≤10 μm. Particularly preferably, 2 μm≤$D_2$≤8 μm. Even preferably, 2 μm≤$D_2$≤6 μm.

The support layer 101 includes one or more of polymer materials. In some embodiments, the polymer materials may be selected from one or more of polyamides, polyimides, polyesters, polyolefins, polyynes, siloxane polymers, polyethers, polyols, polysulfones, polysaccharide polymers, amino acid polymers, polysulfur nitrides, aromatic ring polymers, aromatic heterocyclic polymers, epoxy resin, phenolic resin, derivatives thereof, cross linkers thereof, and copolymers thereof.

In some preferred embodiments, the polymer materials may include one or more of polycaprolactam (commonly known as nylon 6), polyhexamethylene adipamide (commonly known as nylon 66), polyparaphenylene terephthalamide (PPTA), polyisophthaloyl metaphenylene diamine (PMIA), polyethylene terephthalate (PET), polybutylene terephthalate (PBT), polyethylene naphthalate (PEN), polycarbonate (PC), polyethylene (PE), polypropylene (PP), polypropylene (PPE), polyvinyl alcohol (PVA), polystyrene (PS), polyvinyl chloride (PVC), polyvinylidene fluoride (PVDF), polytetrafluoroethylene (PTEE), poly (sodium styrene sulfonate) (PSS), polyacetylene (PA), silicone rubber, polyoxymethylene (POM), polyphenylene ether (PPO), polyphenylene sulfide (PPS), polyethylene glycol (PEG), cellulose, starch, protein, polyphenylene, polypyrrole (PPy), polyaniline (PAN), polythiophene (PT), polypyridine (PPY), acrylonitrile-butadiene-styrene copolymer (ABS), derivatives thereof, cross linkers thereof, and copolymers thereof.

In some embodiments, the support layer 101 may further optionally include additives. The additives may include one or more of metallic materials and inorganic non-metallic materials. The metal material additives may include one or more of aluminum, aluminum alloy, copper, copper alloy, nickel, nickel alloy, titanium, titanium alloy, iron, iron alloy, silver, and silver alloy. The inorganic non-metallic material additives may include one or more of carbon-based materials, alumina, silicon dioxide, silicon nitride, silicon carbide, boron nitride, silicate, and titanium oxide, and for example, include one or more of glass materials, ceramics materials and ceramic composite materials. The carbon-based material additives are, for example, one or more of graphite, superconducting carbon, acetylene black, carbon black, Ketjen black, carbon dots, carbon nanotubes, graphene, and carbon nanofibers.

The additives may further include metal-coated carbon-based materials, such as one or more of nickel-coated graphite powder and nickel-coated carbon fibers.

In some preferred embodiments, the support layer 101 adopts one or more of insulating polymer materials and insulating polymer-based composite materials. The insulating polymer-based composite materials may include one or more of the above polymer materials and one or more of the above additives, and have electrical insulating property. The support layer 101 has a relatively high volume resistivity, which is beneficial to improving the safety performance of the electrochemical device.

Preferably, the support layer 101 may include one or more of polyethylene terephthalate (PET), polybutylene terephthalate (PBT), polyethylene naphthalate (PEN), poly(sodium styrene sulfonate) (PSS) and polyimide (PI).

In some embodiments, the support layer 101 may be of a single-layer structure, or a composite layer structure of two or more layers, such as two layers, three layers, or four layers.

Figure 2:
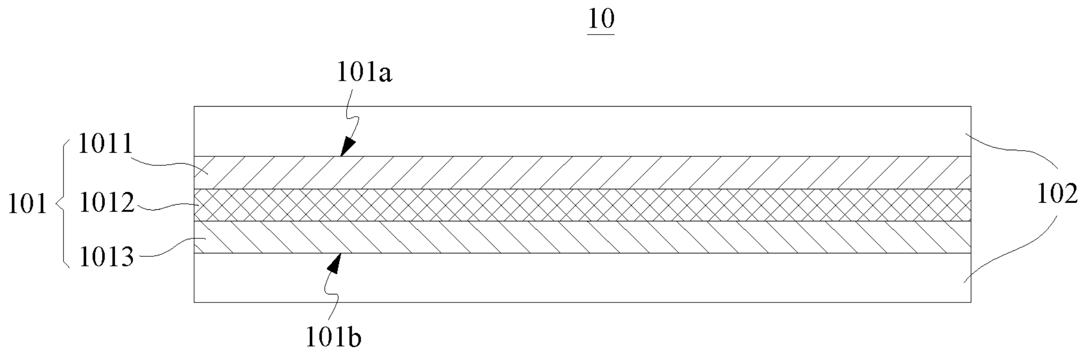
FIG. 2 is a schematic structural diagram of a positive electrode current collector according to another embodiment of the present application.

FIG. 2 is a schematic structural diagram of another positive electrode current collector 10 according to an embodiment of the present application. Referring to FIG. 2, the support layer 101 is of a composite layer structure formed by laminating a first sublayer 1011, a second sublayer 1012, and a third sublayer 1013. The support layer 101 of the composite layer structure has a first surface 101*a* and a second surface 101*b* opposite to each other, and the aluminum-based conductive layer 102 is laminated on the first surface 101*a* and the second surface 101*b* of the support layer 101. Apparently, the aluminum-based conductive layer 102 may be disposed only on the first surface 101*a* of the support layer 101, or only on the second surface 101*b* of the support layer 101.

When the support layer 101 is of a composite layer structure of two or more layers, materials of the sublayers may be the same or different.

The inventors' intensive research found that, especially when the thickness $D_2$ of the support layer 101 is not more than 10 μm, and more particularly not more than 8 μm, the brittleness parameter of the positive electrode current collector 10 is a more critical parameter for the mechanics and mechanical properties of the positive electrode current collector 10, which will affect the machining property, preparation yield, use reliability, etc. of the positive electrode current collector 10 to a greater extent.

Figure 3:
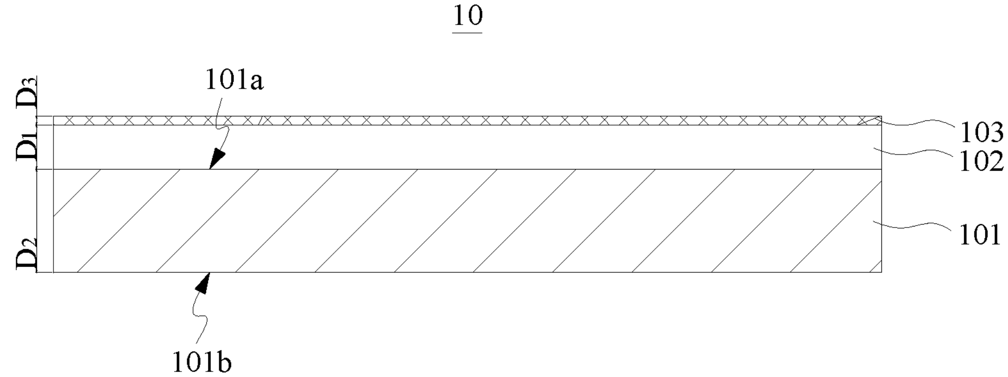
FIG. 3 is a schematic structural diagram of a positive electrode current collector according to another embodiment of the present application.
Figure 4:
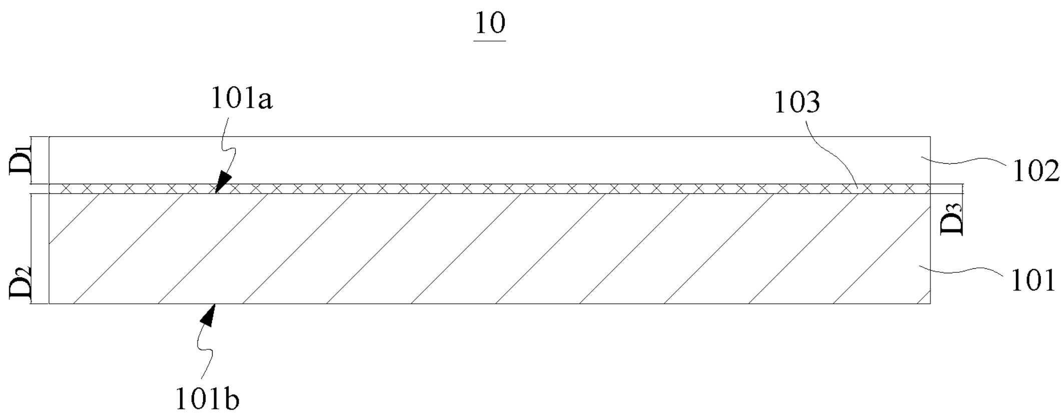
FIG. 4 is a schematic structural diagram of a positive electrode current collector according to another embodiment of the present application.
Figure 5:
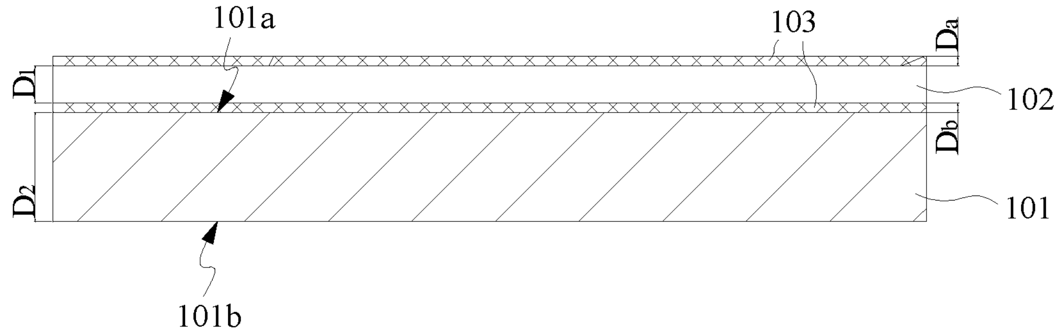
FIG. 5 is a schematic structural diagram of a positive electrode current collector according to another embodiment of the present application.

In some embodiments, the positive electrode current collector 10 further optionally includes a protective layer 103. Referring to FIGS. 3 to 5, the protective layer 103 may be disposed between the aluminum-based conductive layer 102 and the support layer 101. Alternatively, the protective layer 103 may be disposed on the surface of the aluminum-based conductive layer 102 away from the support layer 101. Alternatively, the protective layer 103 may be disposed between the aluminum-based conductive layer 102 and the support layer 101, and on the surface of the aluminum-based conductive layer 102 away from the support layer 101.

The protective layer 103 can protect the aluminum-based conductive layer 102, prevent the aluminum-based conductive layer 102 from chemical corrosion or mechanical damage, and ensure the working stability and service life of the positive electrode current collector 10, which is beneficial to enabling the electrochemical device to have relatively high safety performance and electrochemical performance. In addition, the protective layer 103 can also increase the strength of the positive electrode current collector 10.

It is understandable that, FIGS. 3 to 5 show the aluminum-based conductive layer 102 on a single side of the support layer 101, and the protective layer 103 on either or both of two opposite surfaces of the aluminum-based conductive layer 102 in its thickness direction. However, in other embodiments, the aluminum-based conductive layer 102 may be respectively disposed on two opposite surfaces of the support layer 101, the protective layer 103 may be disposed on either or both of two opposite surfaces of either aluminum-based conductive layer 102 in its thickness direction, and the protective layer 103 may also be disposed on either or both of two opposite surfaces of two aluminum-based conductive layers 102 in their thickness direction.

In some embodiments, the protective layer 103 may include one or more of metal, metal oxide, and conductive carbon.

The metal may include one or more of nickel, chromium, nickel-based alloy, and copper-based alloy. The nickel-based alloy is an alloy formed by adding one or more other elements to pure nickel as a matrix, and is preferably a nickel-chromium alloy. The nickel-chromium alloy is an alloy formed of metallic nickel and metallic chromium. Optionally, a weight ratio of nickel to chromium in the nickel-chromium alloy is from 1:99 to 99:1, such as 9:1. The copper-based alloy is an alloy formed by adding one or more other elements to pure copper as a matrix, and is preferably a nickel-copper alloy. Optionally, a weight ratio of nickel to copper in the nickel-copper alloy is from 1:99 to 99:1, such as 9:1.

The metal oxide may include one or more of aluminum oxide, cobalt oxide, chromium oxide, and nickel oxide.

The conductive carbon may include one or more of graphite, superconducting carbon, acetylene black, carbon black, Ketjen black, carbon dots, carbon nanotubes, graphene and carbon nanofibers, and further include one or more of carbon black, carbon nanotubes, acetylene black, and graphene.

In some embodiments, the protective layer 103 may include one or more of nickel, chromium, nickel-based alloy, copper-based alloy, aluminum oxide, cobalt oxide, chromium oxide, nickel oxide, graphite, superconducting carbon, acetylene black, carbon black, Ketjen black, carbon dots, carbon nanotubes, graphene, and carbon nanofibers.

As some examples, referring to FIG. 3, the positive electrode current collector 10 includes a support layer 101, an aluminum-based conductive layer 102 and a protective layer 103 that are laminated. The support layer 101 has a first surface 101*a* and a second surface 101*b* opposite in its thickness direction, the aluminum-based conductive layer 102 is disposed on at least one of the first surface 101*a* and the second surface 101*b* of the support layer 101, and the protective layer 103 is disposed on a surface of the aluminum-based conductive layer 102 facing away from the support layer 101.

The protective layer 103 disposed on the surface of the aluminum-based conductive layer 102 facing away from the support layer 101 (referred to as an upper protective layer for short) protects the aluminum-based conductive layer 102 from chemical corrosion and mechanical damage. In particular, the upper protective layer can also improve the interface between the positive electrode current collector 10 and the positive electrode active material layer and improve the bonding force between the positive electrode current collector 10 and the positive electrode active material layer. The above effects can be further improved if the upper protective layer is a metal protective layer or metal oxide protective layer.

Further, the upper protective layer of the positive electrode current collector 10 is preferably a metal oxide protective layer, for example, aluminum oxide, cobalt oxide, nickel oxide, chromium oxide, etc. The metal oxide protective layer has high hardness and mechanical strength, a larger specific surface area, and better corrosion resistance, and can better protect the aluminum-based conductive layer 102. In addition, a metal oxide protective layer can further improve safety performance during nail penetration of the positive electrode current collector 10.

As some other examples, referring to FIG. 4, the positive electrode current collector 10 includes a support layer 101, an aluminum-based conductive layer 102 and a protective layer 103 that are laminated. The support layer 101 has a first surface 101*a* and a second surface 101*b* opposite in its thickness direction, the aluminum-based conductive layer 102 is laminated on at least one of the first surface 101*a* and the second surface 101*b* of the support layer 101, and the protective layer 103 is laminated between the aluminum-based conductive layer 102 and the support layer 101.

The protective layer 103 disposed between the aluminum-based conductive layer 102 and the support layer 101 (referred to as a lower protective layer for short) protects the aluminum-based conductive layer 102 from chemical corrosion and mechanical damage. Meanwhile, the lower protective layer can also improve the bonding force between the aluminum-based conductive layer 102 and the support layer 101, and prevent the aluminum-based conductive layer 102 from separating from the support layer 101, thereby improving the supporting and protecting effect on the aluminum-based conductive layer 102.

Optionally, the lower protective layer is a metal oxide or metal protective layer. The metal oxide protective layer has relatively high corrosion resistance and large specific surface area, which can further improve the interface bonding force between the aluminum-based conductive layer 102 and the support layer 101, so that the lower protective layer can better protect the aluminum-based conductive layer 102 to improve the performance of the electrochemical device. In addition, the metal oxide protective layer has higher hardness and better mechanical strength, which is more beneficial to improving the strength of the positive electrode current collector 10. The metal protective layer can protect the aluminum-based conductive layer 102 from chemical corrosion and mechanical damage, and improve the electrical conductivity of the positive electrode current collector 10, thereby improving the performance of the electrochemical device. The lower protective layer of the positive electrode current collector 10 is preferably a metal oxide protective layer.

As still other examples, referring to FIG. 5, the positive electrode current collector 10 includes a support layer 101, an aluminum-based conductive layer 102 and a protective layer 103 that are laminated. The support layer 101 has a first surface 101*a* and a second surface 101*b* opposite in its thickness direction, the aluminum-based conductive layer 102 is laminated on at least one of the first surface 101*a* and the second surface 101*b* of the support layer 101, and the protective layer 103 is disposed between the aluminum-based conductive layer 102 and the support layer 101 and on the surface of the aluminum-based conductive layer 102 away from the support layer 101.

The protective layer 103 is disposed on both surfaces of the aluminum-based conductive layer 102 to more fully protect the aluminum-based conductive layer 102, so that the positive electrode current collector 10 has relatively high comprehensive performance.

It is understandable that the protective layers 103 on the two surfaces of the aluminum-based conductive layer 102 may be made of the same or different materials, and may have the same or different thicknesses.

In some embodiments, the thickness $D_3$ of the protective layer 103 satisfies 1 nm≤$D_3$≤200 nm, and $D_3$≤0.1 $D_1$. For example, the thickness $D_3$ of the protective layer 103 may be ≤200 nm, ≤180 nm, ≤150 nm, ≤120 nm, ≤100 nm, ≤80 nm, ≤60 nm, ≤55 nm, ≤50 nm, ≤45 nm, ≤40 nm, ≤30 nm or ≤20 nm, and further may be ≥1 nm, ≥2 nm, ≥5 nm, ≥8 nm, ≥10 nm, ≥12 nm, ≥15 nm or ≥18 nm. Preferably, 5 nm≤$D_3$≤200 nm. More preferably, 10 nm≤$D_3$≤200 nm.

The "thickness $D_3$ of the protective layer 103" refers to the thickness of the protective layer 103 on a single side of the aluminum-based conductive layer 102. That is, when the positive electrode current collector 10 includes the upper protective layer, the thickness $D_a$ of the upper protective layer is 1 nm≤$D_a$≤200 nm and $D_a$≤0.1$D_1$; further, 5 nm≤$D_a$≤200 nm; and furthermore, 10 nm≤$D_a$≤200 nm. When the positive electrode current collector 10 includes the lower protective layer, the thickness $D_b$ of the lower protective layer is 1 nm≤$D_b$≤200 nm and $D_b$≤0.1$D_1$; further, 5 nm≤$D_b$≤200 nm; and furthermore, 10 nm≤$D_b$≤200 nm.

The suitable thickness $D_3$ of the protective layer 103 allows to effectively protect the aluminum-based conductive layer 102, and can also ensure that the electrochemical device has relatively high energy density.

When the protective layer 103 is disposed on the two surfaces of the aluminum-based conductive layer 102, that is, when the positive electrode current collector 10 includes the upper protective layer and the lower protective layer, preferably, $D_a$>$D_b$. In this way, the upper protective layer and the lower protective layer cooperatively protect the aluminum-based conductive layer 102 from chemical corrosion and mechanical damage, and enable the electrochemical device to have relatively high energy density. More preferably, 0.5 $D_a$≤$D_b$≤0.8 $D_a$. Thus, the cooperative protection effect of the upper protective layer and the lower protective layer can be better exerted.

It can be understood that the influence of the setting of the protective layer 103 on the brittleness parameter C of the positive electrode current collector 10 is negligible.

The aluminum-based conductive layer 102 can be formed on the support layer 101 by at least one means of mechanical rolling, bonding, vapor deposition, chemical plating, and electroplating. Among them, vapor deposition and electroplating are preferred, that is, the aluminum-based conductive layer 102 is a vapor deposition layer or an electroplating layer. The aluminum-based conductive layer 102 is formed on the support layer 101 by means of vapor deposition or electroplating, which enables relatively high bonding force between the aluminum-based conductive layer 102 and the support layer 101, thereby improving the performance of the positive electrode current collector 10.

The vapor deposition is preferably physical vapor deposition. The physical vapor deposition is preferably at least one of evaporation and sputtering, wherein the evaporation is preferably at least one of vacuum evaporation, thermal evaporation and electron beam evaporation, and the sputtering is preferably magnetron sputtering.

As an example, the aluminum-based conductive layer 102 can be formed by vacuum evaporation. The vacuum evaporation may include: the support layer 101 after surface cleaning treatment is placed in a vacuum evaporation chamber, a metal wire in the metal evaporation chamber is melted and evaporated at a high temperature from 1300° C. to 2000° C., and the evaporated metal passes through a cooling system in the vacuum evaporation chamber and is finally deposited on the support layer 101 to form the aluminum-based conductive layer 102.

When the protective layer 103 exists, the protective layer 103 can be formed on the aluminum-based conductive layer 102 by at least one of vapor deposition, in-situ formation and coating. The vapor deposition may be the aforementioned vapor deposition. The in-situ formation is preferably in-situ passivation, that is, a method of forming a metal oxide passivation layer in situ on a metal surface. The coating is preferably at least one of roll coating, extrusion coating, knife coating, and gravure coating.

Preferably, the protective layer 103 is formed on the aluminum-based conductive layer 102 by at least one means of vapor deposition and in-situ formation. This enables relatively high bonding force between the aluminum-based conductive layer 102 and the protective layer 103, thereby better protecting the positive electrode current collector 10 by the protective layer 102 and ensuring good working performance of the positive electrode current collector 10.

When the protective layer 103 (that is, the lower protective layer) is disposed between the aluminum-based conductive layer 102 and the support layer 101, the lower protective layer may be formed on the support layer 101 first, and then the aluminum-based conductive layer 102 is formed on the lower protective layer. The lower protective layer may be formed on the support layer 101 by at least one means of vapor deposition and coating, and preferably by vapor deposition. The aluminum-based conductive layer 102 may be formed on the lower protective layer by at least one means of mechanical rolling, bonding, vapor deposition and chemical plating, and preferably by vapor deposition.

Positive Electrode Plate

The second aspect of the present application provides a positive electrode plate. The positive electrode plate includes a positive electrode current collector and a positive electrode active material layer that are laminated, wherein the positive electrode current collector is any positive electrode current collector according to the first aspect of the present application.

Since the positive electrode plate of the present application adopts the positive electrode current collector according to the first aspect of the present application, it has relatively high mechanics, relatively high preparation yield, relatively high use safety and reliability, low weight and relatively high electrochemical performance.

Figure 6:
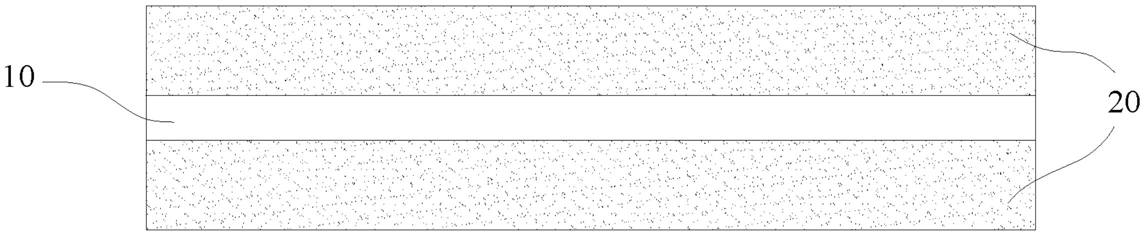
FIG. 6 is a schematic structural diagram of a positive electrode plate according to an embodiment of the present application.

FIG. 6 shows a positive electrode plate 30 as an example. Referring to FIG. 6, the positive electrode plate 30 includes a positive electrode current collector 10 and positive electrode active material layers 20 that are laminated, the positive electrode current collector 10 has two opposite surfaces in its thickness direction, and the positive electrode active material layers 20 are laminated on the two surfaces of the positive electrode current collector 10. It can be understood that the positive electrode active material layer 20 may also be laminated on either of the two surfaces of the positive electrode current collector 10.

The positive electrode active material layer 20 may adopt a positive electrode active material known in the art that can achieve reversible intercalation/deintercalation of active ions, which is not limited in this application. For example, the positive electrode active material for lithium-ion secondary batteries may be one or more of lithium transition metal composite oxides, and composite oxides obtained by adding other transition metals or non-transition metals or non-metals to lithium transition metal composite oxides. The transition metals may be one or more of Mn, Fe, Ni, Co, Cr, Ti, Zn, V, Al, Zr, Ce, and Mg.

As an example, the positive electrode active material may be selected from one or more of lithium cobalt oxide, lithium nickel oxide, lithium manganese oxide, lithium nickel manganese oxide, lithium nickel cobalt manganese oxide, lithium nickel cobalt aluminum oxide, and lithium-containing phosphate of an olivine structure. For example, the positive electrode active material includes one or more of $LiMn_2O_4$, $LiNiO_2$, $LiCoO_2$, $LiNi_{1-y}Co_yO_2$ ($0<y<1$), $LiNi_aCo_bAl_{1-a-b}O_2$ ($0<a<1$, $0<b<1$, $0<a+b<1$), $LiMn_{1-m-n}Ni_mCo_nO_2$ ($0<m<1$, $0<n<1$, $0<m+n<1$), $LiMPO_4$ (M may be one or more of Fe, Mn, and Co), and $Li_3V_2(PO_4)_3$.

In some embodiments, the positive electrode active material layer 20 may further include a binder. This application does not limit the type of the binder. As an example, the binder may be selected from one or more of styrene-butadiene rubber (SBR), water-based acrylic resin, carboxymethyl cellulose (CMC), polyvinylidene fluoride (PVDF), polytetrafluoroethylene (PTFE), ethylene-vinyl acetate copolymer (EVA), polyvinyl alcohol (PVA), and polyvinyl butyral (PVB).

In some embodiments, the positive electrode active material layer 20 may further include a conductive agent. This application does not limit the type of the conductive agent. As an example, the conductive agent may be selected from one or more of graphite, superconducting carbon, acetylene black, carbon black, Ketjen black, carbon dots, carbon nanotubes, graphene, and carbon nanofibers.

The positive electrode plate 30 can be prepared according to a conventional method in the art, such as a coating method. As an example, the positive electrode active material and optional conductive agent and binder are dispersed in a solvent which may be N-methylpyrrolidone (NMP) to form a uniform positive electrode slurry; the positive electrode slurry is coated on the positive electrode current collector 10, and the positive electrode plate 30 is obtained after steps including drying and the like.

Electrochemical Device

The third aspect of the present application provides an electrochemical device. The electrochemical device includes a positive electrode plate, a negative electrode plate and an electrolyte, wherein the positive electrode plate is any positive electrode plate according to the second aspect of the present application.

Examples of the electrochemical device may be a battery, a battery module including the battery, and a battery pack including the battery. Examples of the battery may be a primary battery and a secondary battery. Specific examples include, but are not limited to, a lithium-ion secondary battery, a lithium primary battery, a sodium ion battery, a magnesium ion battery, etc.

The electrochemical device of the present application adopts the positive electrode plate provided according to the second aspect of the present application, and therefore has relatively high comprehensive electrochemical performance, including relatively high energy density, rate performance, cycle performance and safety performance.

In some embodiments, the negative electrode plate includes a negative electrode current collector and a negative electrode active material layer disposed on the negative electrode current collector. For example, the negative electrode current collector has two opposite surfaces in its thickness direction, and the negative electrode active material layer is laminated on either or both of the two surfaces.

The negative electrode active material layer may adopt a negative electrode active material known in the art that can achieve reversible intercalation/deintercalation of active ions, which is not limited in this application. For example, the negative electrode active material for lithium-ion secondary batteries may include one or more of metallic lithium, natural graphite, artificial graphite, mesocarbon microbeads (MCMB), hard carbon, soft carbon, silicon, silicon-carbon composite, SiO, Li—Sn alloy, Li—Sn—O alloy, Sn, SnO, $SnO_2$, lithium titanate of a spinel structure, and Li—Al alloy.

Optionally, the negative electrode active material layer may further include a conductive agent. This application does not limit the type of the conductive agent. As an example, the conductive agent may be selected from one or more of graphite, superconducting carbon, acetylene black, carbon black, Ketjen black, carbon dots, carbon nanotubes, graphene, and carbon nanofibers.

Optionally, the negative electrode active material layer may further include a binder. This application does not limit the type of the binder. As an example, the binder may be selected from one or more of styrene-butadiene rubber (SBR), water-based acrylic resin, carboxymethyl cellulose (CMC), polyvinylidene fluoride (PVDF), polytetrafluoroethylene (PTFE), ethylene-vinyl acetate copolymer (EVA), polyvinyl alcohol (PVA), and polyvinyl butyral (PVB).

The negative electrode plate can be prepared according to a conventional method in the art, such as a coating method. As an example, the negative electrode active material and optional conductive agent and binder are dispersed in a solvent which may be NMP or deionized water to form a uniform negative electrode slurry; the negative electrode slurry is coated on the negative electrode current collector, and the negative electrode plate is obtained after steps including drying and the like.

The negative electrode current collector may include one or more of copper, copper alloy, nickel, nickel alloy, titanium and silver, for example, one or more of copper and copper alloy. Mass percentage content of copper element in the copper alloy is preferably 80 wt % or more, and more preferably 90 wt % or more.

In some embodiments, the electrolyte may be a solid electrolyte or a non-aqueous electrolyte. The non-aqueous electrolyte may be obtained by dispersing an electrolyte salt in an organic solvent. In the electrolyte, the organic solvent serves as a medium to transport ions in electrochemical reaction, and may adopt any organic solvent in the art. As a source of ions, the electrolyte salt may be any electrolyte salt in the art.

For example, the organic solvent for lithium-ion secondary batteries may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethylene propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), dimethyl sulfone (MSM), methyl ethyl sulfone (EMS), and diethyl sulfone (ESE).

For example, the electrolyte salt for lithium-ion secondary batteries may be selected from one or more of $LiPF_6$ (lithium hexafluorophosphate), $LiBF_4$ (lithium tetrafluoroborate), $LiClO_4$ (lithium perchlorate), $LiAsF_6$ (lithium hexafluoroarsenate), LiFSI (lithium difluorosulfimide), LiTFSI (lithium bistrifluoromethanesulfonimide), LiTFS (lithium trifluoromethanesulfonate), LiDFOB (lithium difluorooxalate), LiBOB (lithium bisoxalate), $LiPO_2F_2$ (lithium difluorophosphate), LiDFOP (lithium difluorobisoxalate phosphate), and LiTFOP (lithium tetrafluorooxalate phosphate).

The electrolyte may further optionally include additives. The type of additives is not specifically limited, and may be selected according to requirements. For example, the additives may include negative electrode film-forming additives, positive electrode film-forming additives, and additives that can improve some performances of the electrochemical device, such as additives that improve overcharge performance of the electrochemical device, additives that improve high-temperature performance of the electrochemical device, and additives that improve low-temperature performance of the electrochemical device.

As an example, the additives may include one or more of vinylene carbonate (VC), vinyl ethylene carbonate (VEC), fluoroethylene carbonate (FEC), succinonitrile (SN), adiponitrile (ADN), 1,3-propylene sultone (PST), tris(trimethylsilane) phosphate (TMSP), and tris(trimethylsilane) borate (TMSB).

When the electrochemical device adopts the electrolyte, a separator is disposed between the positive electrode plate and the negative electrode plate for separation. The type of separator is not specially limited, and the separator may be any known porous separator with good chemical and mechanical stability, such as one or more of glass fiber, non-woven fabric, polyethylene, polypropylene, and polyvinylidene fluoride. The separator may be a single-layer film or a multi-layer composite film. When the separator is a multi-layer composite film, materials of respective layers may be the same or different.

In some embodiments, the electrochemical device may be a battery. The battery may include an outer package for packaging the positive electrode plate, the negative electrode plate, and the electrolyte. As an example, the positive electrode plate, the negative electrode plate and the separator can be laminated or wound to form an electrode assembly of a laminated structure or an electrode assembly of a wound structure, and the electrode assembly is packaged in the outer package; the electrolyte may adopt liquid electrolyte, and the liquid electrolyte infiltrates the electrode assembly. The battery may include one or several electrode assemblies, which can be adjusted according to requirements.

In some embodiments, the outer package of the battery may be a soft package, such as a soft bag. The material of the soft bag may be plastic, for example, it may include one or more of polypropylene (PP), polybutylene terephthalate (PBT), polybutylene succinate (PBS), etc. The outer package of the battery may also be a hard shell, such as an aluminum shell.

Figure 7:
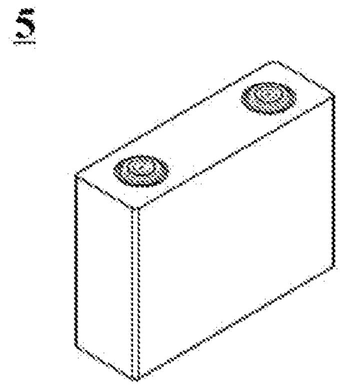
FIG. 7 is a schematic diagram of a battery according to an embodiment of the present application.

The present application does not have particular limitation on the shape of the battery. The battery may be cylindrical, square, or in other arbitrary shape. FIG. 7 shows a battery 5 of a square structure as an example.

In some embodiments, the batteries may be assembled into a battery module, the battery module may include a plurality of batteries, and the specific number can be adjusted according to the application and capacity of the battery module.

Figure 8:
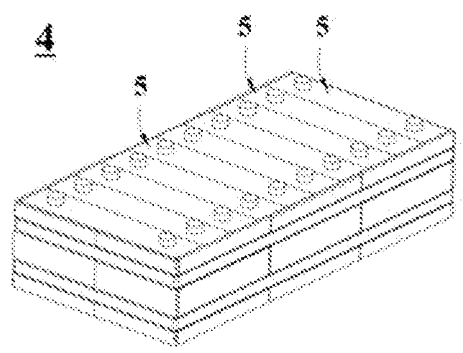
FIG. 8 is a schematic diagram of a battery module according to an embodiment of the present application.

FIG. 8 shows a battery module 4 as an example. Referring to FIG. 8, in the battery module 4, a plurality of batteries 5 may be arranged sequentially in the length direction of the battery module 4. Apparently, they may also be arranged in any other way. Further, the plurality of batteries 5 can be fixed by fasteners.

The battery module 4 may further optionally include a housing with an accommodating space, and the plurality of batteries 5 are received in the accommodating space.

In some embodiments, the above-mentioned battery module may also be assembled into a battery pack, and the number of battery modules included in the battery pack can be adjusted according to the application and capacity of the battery pack.

Figure 9:
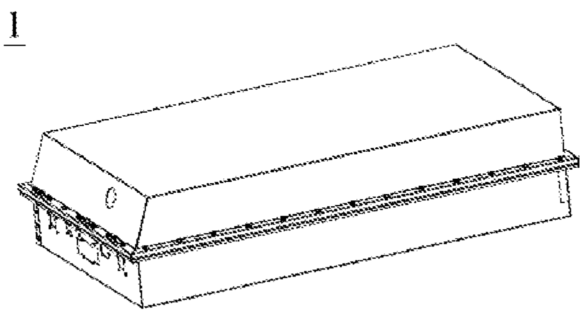
FIG. 9 is a schematic diagram of a battery pack according to an embodiment of the present application.
Figure 10:
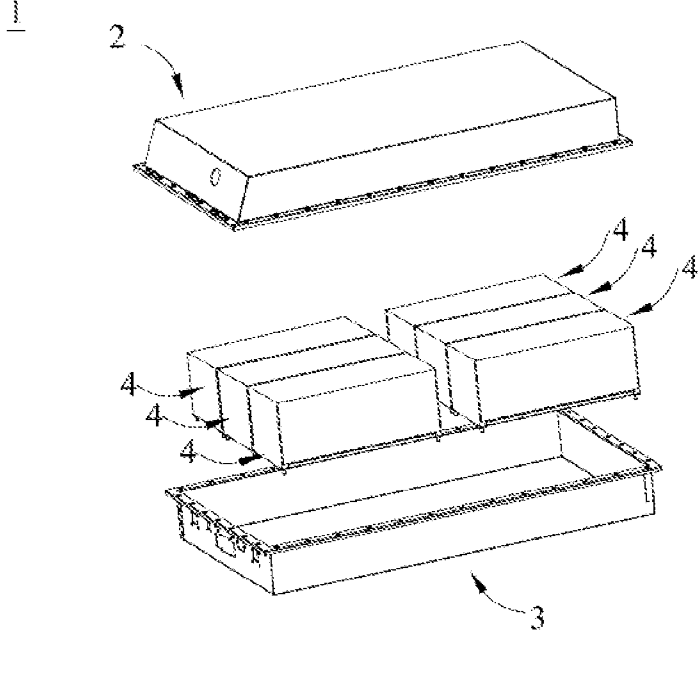
FIG. 10 is an exploded view of FIG. 9.

FIGS. 9 and 10 show a battery pack 1 as an example. Referring to FIGS. 9 and 10, the battery pack 1 may include a battery box and a plurality of battery modules 4 disposed in the battery box. The battery box includes an upper battery box 2 and a lower battery box 3. The upper battery box 2 can cover the lower battery box 3 to form a closed space for receiving the battery modules 4. A plurality of battery modules 4 can be arranged in the battery box in any manner.

Apparatus

The fourth aspect of the present application provides an apparatus. The apparatus includes the electrochemical device according to the third aspect of the present application. The electrochemical device can be used as a power source of the apparatus, and can also be used as an energy storage unit of the apparatus. The apparatus may be, but is not limited to, a mobile device (e.g., a mobile phone, a notebook computer, etc.), an electric vehicle (e.g., a pure electric vehicle, a hybrid electric vehicle, a plug-in hybrid electric vehicle, an electric bicycle, an electric scooter, an electric golf vehicle, an electric truck), an electric train, a ship, a satellite, an energy storage system, etc. The apparatus may select different electrochemical devices, such as batteries, battery modules or battery packs, according to its usage requirements.

Figure 11:
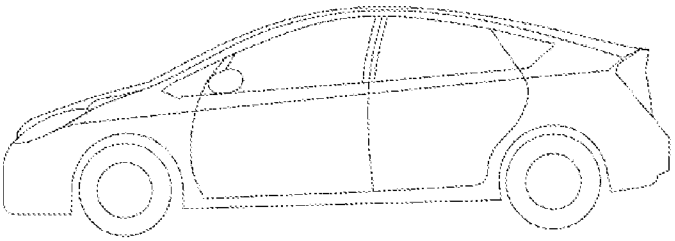
FIG. 11 is a schematic diagram of an apparatus according to an embodiment of the present application.

FIG. 11 shows an apparatus as an example. The apparatus is a pure electric vehicle, a hybrid electric vehicle, or a plug-in hybrid electric vehicle. In order to meet the requirements of the apparatus for high power and high energy density of electrochemical devices, the battery pack or battery module can be used.

As another example, the apparatus may be a mobile phone, a tablet computer, a notebook computer, etc. The apparatus is generally required to be thin and light, and the secondary battery can be used as a power source.

Some exemplary embodiments of the present application are provided as follows.

Embodiment 1. A positive electrode current collector, comprising a polymer material-based support layer and an aluminum-based conductive layer disposed on at least one surface of the support layer;

wherein a thickness $D_1$ of the aluminum-based conductive layer, a tensile strength T of the support layer, and a thickness $D_2$ of the support layer satisfy a relational formula 1, $$0.01 \le (200 \times D_1)/(T \times D_2) \le 0.5 \quad \text{formula 1}$$

in the formula 1, $D_1$ and $D_2$ are in the same unit, and T is in MPa.

Embodiment 2. The positive electrode current collector according to embodiment 1, wherein the thickness $D_1$ of the aluminum-based conductive layer, the tensile strength T of the support layer, and the thickness $D_2$ of the support layer satisfy a relational formula 1.1, $$0.05 \le (200 \times D_1)/(T \times D_2) \le 0.3. \quad \text{formula 1.1}$$

Embodiment 3. The positive electrode current collector according to embodiment 1 or 2, wherein the tensile strength T of the support layer satisfies 100 MPa≤T≤400 MPa, and preferably 150 MPa≤T≤300 MPa.

Embodiment 4. The positive electrode current collector according to embodiment 1 or 2, wherein the support layer has a Young's modulus E≥2 GPa, and preferably 2 GPa≤E≤20 GPa.

Embodiment 5. The positive electrode current collector according to any one of embodiments 1 to 4, wherein the thickness $D_1$ of the aluminum-based conductive layer satisfies 30 nm≤$D_1$≤3 μm, preferably 300 nm≤$D_1$≤2 μm, preferably 500 nm≤$D_1$≤1.5 μm, and more preferably 800 nm≤$D_1$≤1.2 μm; and/or, the thickness $D_2$ of the support layer satisfies 1 μm≤$D_2$≤30 μm, preferably 1 μm≤$D_2$≤20 μm, preferably 1 μm≤$D_2$≤15 μm, preferably 2 μm≤$D_2$≤10 μm, preferably 2 μm≤$D_{2\le8}$ μm, and more preferably 2 μm≤$D_2$≤6 μm.

Embodiment 6. The positive electrode current collector according to any one of embodiments 1 to 5, wherein the aluminum-based conductive layer comprises one or more of aluminum and aluminum alloy, and mass percentage content of aluminum element in the aluminum alloy is preferably 80 wt % or more, and 90 wt % or more.

Embodiment 7. The positive electrode current collector according to any one of embodiments 1 to 6, wherein the aluminum-based conductive layer is a vapor deposited layer or an electroplated layer.

Embodiment 8. The positive electrode current collector according to any one of embodiments 1 to 7, wherein the support layer comprises one or more of polymer materials, and the polymer materials are selected from one or more of polyamide, polyimide, polyethylene terephthalate, polybutylene terephthalate, polyethylene naphthalate, polycarbonate, polyethylene, polypropylene, poly(propylene-co-ethylene), acrylonitrile-butadiene-styrene copolymer, polyvinyl alcohol, polystyrene, polyvinyl chloride, polyvinylidene fluoride, polytetrafluoroethylene, sodium polystyrene sulfonate, polyacetylene, silicone rubber, polyoxymethylene, polyphenylene ether, polyphenylene sulfide, polyethylene glycol, polysulfur nitride, polyphenylene, polypyrrole, polyaniline, polythiophene, polypyridine, cellulose, starch, protein, epoxy resin, phenol resin, derivatives thereof, cross linkers thereof, and copolymers thereof.

Embodiment 9. The positive electrode current collector according to any one of embodiments 1 to 8, wherein the support layer further comprises an additive, and the additive comprises one or more of metallic materials and inorganic non-metallic materials.

Embodiment 10. The positive electrode current collector according to any one of embodiments 1 to 9, further comprising a protective layer, wherein the protective layer is disposed between the aluminum-based conductive layer and the support layer, and/or, the protective layer is disposed on a surface of the aluminum-based conductive layer away from the support layer.

Embodiment 11. The positive electrode current collector according to embodiment 10, wherein the protective layer comprises one or more of metals, metal oxides and conductive carbon, and preferably comprises one or more of nickel, chromium, nickel-based alloy, copper-based alloy, alumina, cobalt oxide, chromium oxide, nickel oxide, graphite, superconducting carbon, acetylene black, carbon black, Ketjen black, carbon dots, carbon nanotubes, graphene, and carbon nanofibers.

Embodiment 12. The positive electrode current collector according to embodiment 10 or 11, wherein a thickness $D_3$ of the protective layer satisfies: 1 nm≤$D_3$≤200 nm, and $D_3$≤0.1 $D_1$.

Embodiment 13. A positive electrode plate, comprising a positive electrode current collector and a positive active material layer disposed on the positive electrode current collector, wherein the positive electrode current collector is the positive electrode current collector according to any one of embodiments 1 to 12.

Embodiment 14. An electrochemical device, comprising a positive electrode plate, a negative electrode plate and an electrolyte, wherein the positive electrode plate is the positive electrode plate according to embodiment 13.

Embodiment 15. An apparatus, comprising the electrochemical device according to embodiment 14.

EXAMPLES

The following examples more specifically describe the content disclosed in the present application, and these examples are only used for explanatory description, because various modifications and changes within the scope of the present disclosure are obvious to those skilled in the art. Unless otherwise stated, all parts, percentages, and ratios described in the following examples are based on weight, all reagents used in the examples are commercially available or synthesized according to conventional methods and can be directly used without further treatment, and all instruments used in the examples are commercially available.

Preparation Methods

Preparation of Conventional Negative Electrode Current Collector

A copper foil with a thickness of 8 μm was used.

Preparation of Conventional Negative Electrode Plate

Negative electrode active materials including graphite, conductive carbon black, sodium carboxymethyl cellulose as a thickener, and styrene butadiene rubber emulsion as a binder were mixed thoroughly at a weight ratio of 96.5:1.0:1.0:1.5 in an appropriate amount of deionized water to form a uniform negative electrode slurry; the negative electrode slurry was coated on a negative electrode current collector, and a negative electrode plate was obtained after steps including drying and the like.

Preparation of Positive Electrode Current Collector

A polymer material-based support layer with a predetermined thickness was selected and subjected to surface cleaning treatment, the support layer after the surface cleaning treatment was placed in a vacuum evaporation chamber, a high-purity aluminum wire in the metal evaporation chamber was melted and evaporated at a high temperature from 1300° C. to 2000° C., and the evaporated metal passed through a cooling system in the vacuum evaporation chamber and was finally deposited on two surfaces of the support layer to form aluminum-based conductive layers.

Preparation of Conventional Positive Electrode Current Collector

An aluminum foil with a thickness of 12 μm was used.

Preparation of Positive Electrode Plate

Positive electrode active materials including $LiNi_{1/3}Co_{1/3}Mn_{1/3}O_2$(NCM333), conductive carbon black, and polyvinylidene fluoride (PVDF) as a binder were mixed thoroughly at a weight ratio of 93:2:5 in an appropriate amount of N-methylpyrrolidone (NMP) solvent to form a uniform positive electrode slurry; the positive electrode slurry was coated on a positive electrode current collector, and a positive electrode plate was obtained after steps including drying and the like.

Preparation of Electrolyte

Ethylene carbonate (EC) and ethyl methyl carbonate (EMC) at a volume ratio of 3:7 were mixed uniformly to obtain an organic solvent, and then 1 mol/L $LiPF_6$ was uniformly dissolved in the organic solvent.

Preparation of Lithium-Ion Secondary Battery

The positive electrode plate, the separator which was a PP/PE/PP composite film, and the negative electrode plate were laminated in sequence and then wound into an electrode assembly, and the electrode assembly was packaged into a packaging housing, injected with the electrolyte and sealed to obtain a lithium-ion secondary battery.

Test Section

1. Test of the Positive Electrode Current Collector

1) Test of Brittleness Parameter of the Positive Electrode Current Collector

The support layer was cut into a sample with a width of 15 mm and a length of 150 mm which was then loaded into an upper clamp and a lower clamp of American INSTRON 3365 universal tensile tester with an initial length set to 50 mm, and then a tensile test was performed at a tensile rate of 5 mm/min until the sample broke; maximum tensile force F borne when the sample broke was recorded, and a tensile strength T of the support layer was calculated according to T=F/S. S was initial cross-sectional area of the sample, which was equal to the product of the width and thickness of the sample (i.e., the thickness $D_2$ of the support layer).

The thickness $D_1$ of the aluminum-based conductive layer and the thickness $D_2$ of the support layer were measured by a ten-thousandth micrometer.

The brittleness parameter C of the positive electrode current collector=(200×the thickness $D_1$ of the aluminum-based conductive layer)/(the tensile strength T of the support layer×the thickness $D_2$ of the support layer).

2) Test of Elongation at Break of the Positive Electrode Current Collector

The positive electrode current collector was cut into a sample of 15 mm×200 mm, a tensile test was performed by means of American INSTRON 3365 universal tensile tester at normal temperature and pressure (25° C., 0.1 MPa), an initial position was set such that the sample between the clamps was 50 mm long, the sample was stretched at a speed of 5 mm/min, device displacement γ (mm) at tensile break was recorded, and finally the elongation at break was calculated as (γ/50)×100%.

2. Performance Test of the Battery (1) Cycle Performance Test

At 45° C., the lithium-ion secondary battery was charged to 4.2 V at a constant current rate of 1C and then charged at a constant voltage until the current was ≤0.05C, and afterwards discharged at a constant current rate of 1C to 2.8 V. This was a charge-discharge cycle. The discharge capacity at this time was a discharge capacity of the first cycle. The lithium-ion secondary battery was subjected to 1000 charge-discharge cycles according to the above method, the discharge capacity of the 1000th cycle was recorded, and a capacity retention rate of the lithium-ion secondary battery after 1000 cycles at 1C/1C was calculated.

Capacity retention rate of lithium-ion secondary battery at 45° C. after 1000 cycles at 1C/1C (%)=the discharge capacity at the 1000th cycle/the discharge capacity at the first cycle×100%

Test Results

1. Effect of the Positive Electrode Current Collector in Improving the Gravimetric Energy Density of the Electrochemical Device

TABLE 1

| Number of positive electrode current collector | Support layer | | Aluminum-based conductive layer | | Thickness of positive electrode current collector | Weight percentage of positive electrode current collector |
|---|---|---|---|---|---|---|
| collector | Material | $D_2$ (μm) | Material | $D_1$ (μm) | (μm) | (%) |
| Positive electrode current collector 1 | PET | 10 | Al | 0.5 | 11.0 | 48.3 |
| Positive electrode current collector 2 | PI | 6 | Al | 0.3 | 6.6 | 30.0 |
| Positive electrode current collector 3 | PI | 5 | Al | 2 | 9 | 54.1 |

TABLE 1-continued

| Number of positive electrode current collector | Support layer | | Aluminum-based conductive layer | | Thickness of positive electrode current collector | Weight percentage of positive electrode current collector |
|---|---|---|---|---|---|---|
| | Material | $D_2$ (μm) | Material | $D_1$ (μm) | (μm) | (%) |
| Positive electrode current collector 4 | PI | 5 | Al | 1.5 | 8.0 | 45.8 |
| Positive electrode current collector 5 | PET | 10 | Al | 1 | 12 | 40.2 |
| Positive electrode current collector 6 | PET | 4 | Al | 0.9 | 5.8 | 31.0 |
| Positive electrode current collector 7 | PI | 2 | Al | 0.8 | 3.6 | 21.8 |
| Positive electrode current collector 8 | PI | 3 | Al | 0.2 | 3.4 | 15.8 |
| Positive electrode current collector 9 | PI | 1 | Al | 0.4 | 1.8 | 10.9 |
| Conventional positive electrode current collector | / | / | Al | 12.0 | 12.0 | 100 |

In Table 1, the weight percentage of the positive electrode current collector was a percentage of the weight of the positive electrode current collector per unit area divided by the weight of the conventional positive electrode current collector per unit area.

Compared with the existing aluminum foil positive electrode current collector, the weights of the positive electrode current collectors according to the present application were reduced to various degrees, so that gravimetric energy densities of electrochemical devices can be improved.

2. Effect of the Protective Layer on the Electrochemical Performance of the Positive Electrode Current Collector and the Electrochemical Device

TABLE 2-1

| Number of positive electrode current collector | Lower protective layer | | Upper protective layer | |
|---|---|---|---|---|
| | Material | $D_b$ (nm) | Material | $D_a$ (nm) |
| *Positive electrode current collector 7-1 | / | / | Nickel | 1 |
| *Positive electrode current collector 7-2 | / | / | Nickel oxide | 10 |
| *Positive electrode current collector 7-3 | / | / | Aluminum oxide | 50 |
| **Positive electrode current collector 3-4 | / | / | Nickel oxide | 150 |
| *Positive electrode current collector 7-5 | Nickel | 5 | / | / |
| *Positive electrode current collector 7-6 | Aluminum oxide | 20 | / | / |
| *Positive electrode current collector 7-7 | Aluminum oxide | 80 | / | / |
| **Positive electrode current collector 3-8 | Nickel oxide | 100 | / | / |
| *Positive electrode current collector 7-9 | Nickel | 5 | Nickel | 10 |
| *Positive electrode current collector 7-10 | Nickel oxide | 8 | Nickel oxide | 10 |
| *Positive electrode current collector 7-11 | Nickel oxide | 20 | Nickel oxide | 50 |
| **Positive electrode current collector 3-12 | Nickel oxide | 30 | Nickel oxide | 50 |
| **Positive electrode current collector 3-13 | Nickel oxide | 50 | Nickel oxide | 100 |

In Table 2-1,

"*" represents the positive electrode current collector that was based on the positive electrode current collector 7 as shown in Table 1 and was provided with a protective layer; and TABLE 2-1-continued

| Number of positive electrode current collector | Lower protective layer | | Upper protective layer | |
|---|---|---|---|---|
| | Material | $D_b$ (nm) | Material | $D_a$ (nm) |

"**" represents the positive electrode current collector that was based on the positive electrode current collector 3 as shown in Table 1 and was provided with a protective layer.

TABLE 2-2

| Number of battery | Positive electrode plate: Number of positive electrode current collector | Positive electrode plate: Number of positive electrode plate | Negative electrode plate | Capacity retention rate at 45° C. after 1000 1 C/1 C cycles (%) |
|---|---|---|---|---|
| Battery 1-1 | Positive electrode current collector 7 | Positive electrode plate 7 | Conventional negative electrode plate | 82.1 |
| Battery 1-2 | Positive electrode current collector 3 | Positive electrode plate 3 | Conventional negative electrode plate | 83.2 |
| Battery 1-3 | Positive electrode current collector 7-1 | Positive electrode plate 7-1 | Conventional negative electrode plate | 81.9 |
| Battery 1-4 | Positive electrode current collector 7-2 | Positive electrode plate 7-2 | Conventional negative electrode plate | 83.2 |
| Battery 1-5 | Positive electrode current collector 7-3 | Positive electrode plate 7-3 | Conventional negative electrode plate | 86.2 |
| Battery 1-6 | Positive electrode current collector 3-4 | Positive electrode plate 3-4 | Conventional negative electrode plate | 82.5 |
| Battery 1-7 | Positive electrode current collector 7-5 | Positive electrode plate 7-5 | Conventional negative electrode plate | 82.1 |
| Battery 1-8 | Positive electrode current collector 7-6 | Positive electrode plate 7-6 | Conventional negative electrode plate | 85.9 |
| Battery 1-9 | Positive electrode current collector 7-7 | Positive electrode plate 7-7 | Conventional negative electrode plate | 83.4 |
| Battery 1-10 | Positive electrode current collector 3-8 | Positive electrode plate 3-8 | Conventional negative electrode plate | 82.1 |
| Battery 1-11 | Positive electrode current collector 7-9 | Positive electrode plate 7-9 | Conventional negative electrode plate | 82.8 |
| Battery 1-12 | Positive electrode current collector 7-10 | Positive electrode plate 7-10 | Conventional negative electrode plate | 85.2 |
| Battery 1-13 | Positive electrode current collector 7-11 | Positive electrode plate 7-11 | Conventional negative electrode plate | 85.3 |
| Battery 1-14 | Positive electrode current collector 3-12 | Positive electrode plate 3-12 | Conventional negative electrode plate | 85.7 |
| Battery 1-15 | Positive electrode current collector 3-13 | Positive electrode plate 3-13 | Conventional negative electrode plate | 83.5 |
| Battery 1-16 | Conventional Positive electrode current collector | Conventional Positive electrode plate | Conventional negative electrode plate | 86.5 |

It can be seen from Table 2-2 that the cycle life results of the electrochemical devices using the positive electrode current collectors of the present application were good, and were equivalent to the cycle performance of the electrochemical device using conventional positive electrode current collector. This showed that the composite positive electrode current collector of the present application would not have a significant adverse effect on the electrochemical performance of the electrochemical device and positive electrode plate. Particularly, for the electrochemical device made of the composite positive electrode current collector provided with a protective layer, its capacity retention rate at 45° C. after 1000 1C/1C cycles were further improved, indicating that the reliability of the electrochemical device was better.

3. Brittleness Parameter of the Positive Electrode Current Collector and its Influence on Mechanical Properties of the Positive Electrode Current Collector

TABLE 3

| Number of positive electrode current collector | Support layer: Material | Support layer: T (MPa) | Support layer: $D_2$ (μm) | Aluminum-based conductive layer: Material | Aluminum-based conductive layer: $D_1$ (μm) | Elongation at break (%) |
|---|---|---|---|---|---|---|
| Positive electrode current collector A1 | PET | 200 | 10 | Al | 0.5 | 64 |
| Positive electrode current collector A2 | PI | 300 | 6 | Al | 0.45 | 39 |
| Positive electrode current collector A3 | PI | 300 | 5 | Al | 2 | 4.40 |
| Positive electrode current collector A4 | PI | 300 | 5 | Al | 1.5 | 3.40 |

TABLE 3-continued

| Number of positive electrode current collector | Support layer | | | Aluminum-based conductive layer | | Elongation at break (%) |
|---|---|---|---|---|---|---|
| | Material | T (MPa) | $D_2$ (μm) | Material | $D_1$ (μm) | |
| Positive electrode current collector A5 | PET | 200 | 10 | Al | 1 | 4.50 |
| Positive electrode current collector A6 | PET | 200 | 4 | Al | 0.9 | 3.70 |
| Positive electrode current collector A7 | PET | 200 | 2 | Al | 0.8 | 3.10 |
| Positive electrode current collector A8 | PET | 200 | 3 | Al | 0.2 | 2.50 |
| Positive electrode current collector A9 | PET | 200 | 1 | Al | 0.4 | 2.30 |
| Positive electrode current collector A10 | PET | 200 | 10 | Al alloy | 0.5 | 48 |
| Positive electrode current collector A11 | PET | 200 | 10 | Al alloy | 1 | 4.2 |
| Comparative Positive electrode current collector | PET | 200 | 5 | Al | 3 | 1.10 |

In Table 3, the Al alloy was AlMg alloy composed of 95 wt % Al and 5 wt % Mg.

From the results in Table 3, it can be seen that the brittleness parameter C, from 0.01 to 0.5, of the positive electrode current collector improved the elongation at break of the positive electrode current collector, and the elongation at break of the positive electrode current collector was 2% or more, or even 3% or more. Therefore, the positive electrode current collector was ensured to have relatively high mechanics and mechanical properties, so that it can withstand certain deformation without breakage during the production and working process of the electrochemical device. This can be beneficial to improving the machining property of the positive electrode current collector and its stability during use, and effectively prevent it from breaking or cracking during preparation and use, thereby significantly improving yields of the positive electrode current collector and the positive electrode plate and electrochemical device using the same during preparation and their reliability during use.

Described above are merely specific embodiments of the present application, but the protection scope of the present application is not limited to thereto. Any modification, replacement, or other equivalent readily conceived by a skilled person in the art according to the disclosure of the present application shall fall within the protection scope of the present application. Therefore, the protection scope of the present application shall be subject to the protection scope of the claims.

What is claimed is:

1. A positive electrode current collector, consisting of a polymer material-based support layer, a lower protective layer, an aluminum-based conductive layer disposed on at least one surface of the support layer, and an upper protective layer;

a tensile strength T of the support layer satisfies 200 MPa≤T≤300 MPa, the aluminum-based conductive layer comprises one or more of aluminum and aluminum alloy, and mass percentage content of aluminum element in the aluminum alloy is 90 wt % or more, a thickness $D_1$ of the aluminum-based conductive layer satisfies 450 nm≤$D_1$≤500 nm, a thickness $D_2$ of the support layer satisfies 5 μm≤$D_2$≤10 μm, wherein the support layer comprises one or more of polymer materials, and the polymer materials comprise one or more of polyimide and polyethylene terephthalate, and wherein the upper protective layer is disposed on a surface of the aluminum-based conductive layer away from the support layer, and the lower protective layer is disposed between the aluminum-based conductive layer and the support layer, and the lower protective layer is made of nickel oxide.

2. The positive electrode current collector according to claim 1, wherein the support layer has a Young's modulus E≥2 GPa.

3. The positive electrode current collector according to claim 1, wherein the aluminum-based conductive layer is a vapor deposited layer or an electroplated layer.

4. The positive electrode current collector according to claim 1, wherein the support layer further comprises an additive, and the additive comprises one or more of metallic materials and inorganic non-metallic materials.

5. The positive electrode current collector according to claim 1, wherein the upper protective layer comprises one or more of metals, metal oxides and conductive carbon.

6. The positive electrode current collector according to claim 1, wherein a thickness $D_a$ of the upper protective layer satisfies: 1 nm≤$D_a$≤200 nm, and $D_a$≤0.1$D_1$.

7. The positive electrode current collector according to claim 1, wherein a thickness $D_b$ of the lower protective layer satisfies: 1 nm≤$D_b$≤200 nm, and $D_b$≤0.1$D_1$.

8. The positive electrode current collector according to claim 1, wherein a thickness $D_a$ of the upper protective layer and a thickness $D_b$ of the lower protective layer satisfy: 0.5 $D_a$≤$D_b$≤0.8 $D_a$.

9. A positive electrode plate, comprising a positive electrode current collector and a positive active material layer disposed on the positive electrode current collector, wherein the positive electrode current collector is the positive electrode current collector according to claim 1.

10. An electrochemical device, comprising a positive electrode plate, a negative electrode plate and an electrolyte, wherein the positive electrode plate is the positive electrode plate according to claim 9.

11. An apparatus, comprising the electrochemical device according to claim 10.

* * * * *